(12) United States Patent
Duan et al.

(10) Patent No.: US 10,783,280 B2
(45) Date of Patent: Sep. 22, 2020

(54) PHYSICAL UNCLONABLE FUNCTION (PUF) CHIP AND FABRICATION METHOD THEREOF

(71) Applicants: Semiconductor Manufacturing International (Shanghai) Corporation, Shanghai (CN); Semiconductor Manufacturing International (Beijing) Corporation, Beijing (CN)

(72) Inventors: Hui Ping Duan, Shanghai (CN); Kun Peng, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 232 days.

(21) Appl. No.: 15/850,756

(22) Filed: Dec. 21, 2017

(65) Prior Publication Data
US 2018/0181775 A1 Jun. 28, 2018

(30) Foreign Application Priority Data
Dec. 22, 2016 (CN) .......................... 2016 1 1200253

(51) Int. Cl.
*H04L 9/32* (2006.01)
*H01L 23/00* (2006.01)
(Continued)

(52) U.S. Cl.
CPC ............ *G06F 21/73* (2013.01); *G06F 21/604* (2013.01); *G11C 11/417* (2013.01);
(Continued)

(58) Field of Classification Search
None
See application file for complete search history.

(56) References Cited

U.S. PATENT DOCUMENTS

| | | | | |
|---|---|---|---|---|
| 2011/0163088 A1* | 7/2011 | Besling | ................. | H04L 9/3278 |
| | | | | 219/660 |
| 2013/0233608 A1* | 9/2013 | Feng | ..................... | H04L 9/3278 |
| | | | | 174/264 |

(Continued)

FOREIGN PATENT DOCUMENTS

EP 2665094 A1 11/2013

OTHER PUBLICATIONS

The European Patent Office (EPO) The Extended European Search Report for 17207914.7 dated Jun. 6, 2018 10 Pages.

*Primary Examiner* — Michelle Mandala
(74) *Attorney, Agent, or Firm* — Anova Law Group, PLLC

(57) ABSTRACT

A physical unclonable function (PUF) chip and a fabrication method are provided. The fabrication method includes: forming an array of spaced electrode plates on a top metal connection layer of a nude chip, while forming the top metal connection layer; forming a deposition layer, on the top metal connection layer between adjacent electrode plates; forming openings between adjacent electrode plates in a row, each opening having a circumference tangent to the adjacent electrode plates; coating a conductive coating layer on the nude chip, the conductive coating layer including conductive particles with randomly distributed size; and packaging the nude chip to provide the PUF chip.

11 Claims, 4 Drawing Sheets

(51) Int. Cl.
  *G06F 21/73*   (2013.01)
  *G06F 21/60*   (2013.01)
  *H04L 9/08*    (2006.01)
  *G11C 13/00*   (2006.01)
  *G11C 11/417*  (2006.01)

(52) U.S. Cl.
  CPC ...... *G11C 13/0007* (2013.01); *G11C 13/0069* (2013.01); *H01L 23/57* (2013.01); *H04L 9/0866* (2013.01); *H04L 9/3278* (2013.01)

(56) References Cited

U.S. PATENT DOCUMENTS

| | | | |
|---|---|---|---|
| 2014/0203448 A1* | 7/2014 | Song | H01L 21/76877 257/774 |
| 2014/0291602 A1* | 10/2014 | Kenyon | H01L 45/145 257/4 |
| 2014/0346430 A1* | 11/2014 | Nelles | G11C 13/003 257/4 |
| 2015/0084193 A1 | 3/2015 | Feng et al. | |
| 2018/0054887 A1* | 2/2018 | Sekine | H01L 25/0657 |

* cited by examiner

PHYSICAL UNCLONABLE FUNCTION (PUF) CHIP AND FABRICATION METHOD THEREOF

CROSS-REFERENCES TO RELATED APPLICATIONS

This application claims the priority of Chinese patent application No. 201611200253.9, filed on Dec. 22, 2016, the entirety of which is incorporated herein by reference.

FIELD OF THE DISCLOSURE

The present disclosure generally relates to the field of semiconductor technology and, more particularly, relates to a physical unclonable function (PUF) chip and a fabrication method thereof.

BACKGROUND

Smart cards, radio frequency (RF) identification cards, and other physical cards have been widely used in today's daily life. However, more complicated attacking methods have also been developed to destruct chip functions in those physical cards, while more requirements are needed to ensure digitalization security and banking security. How to provide effective authentication has become a fundamental issue for ensuring the security of data, vouchers, and financial information, of a user.

Using physical unclonable technology, personal chips may be protected from data theft. Because of the inherent, unique "fingerprint" of each semiconductor device, encryption key may be protected without being easily duplicated. Users' data can thus be effectively protected.

Currently, the physical unclonable function is realized, by designing a device or a circuit in combination with the chip production process and using a certain process, to add uncertainty to a particular parameter of a chip on a wafer without affecting functions of the chip and to generate a completely unpredictable unique secure password.

However, current fabrication methods of a physical unclonable function (PUF) chip can cause low security of the chip. The disclosed device and method are directed to solve one or more problems set forth above and other problems.

BRIEF SUMMARY OF THE DISCLOSURE

One aspect of the present disclosure includes a method for fabricating a physical unclonable function (PUF) chip. The fabrication method includes: forming an array of spaced electrode plates on a top metal connection layer of a nude chip, while forming the top metal connection layer; forming a deposition layer, on the top metal connection layer between adjacent electrode plates; forming openings between adjacent electrode plates in a row, each opening having a circumference tangent to the adjacent electrode plates; coating a conductive coating layer on the nude chip, the conductive coating layer including conductive particles with randomly distributed size; and packaging the nude chip to provide the PUF chip.

Another aspect of the present disclosure includes a physical unclonable function (PUF) chip. The PUF chip includes an array of spaced electrode plates on a top metal connection layer of a nude chip, and a deposition layer, on the top metal connection layer between adjacent electrode plates. Openings are formed between adjacent electrode plates in a row, and each opening has a circumference tangent to the adjacent electrode plates. The PUF chip also includes a conductive coating layer on the nude chip, the conductive coating layer including conductive particles with randomly distributed size; and a package substrate, packaged with the nude chip including the conductive coating layer.

Other aspects of the present disclosure can be understood by those skilled in the art in light of the description, the claims, and the drawings of the present disclosure.

BRIEF DESCRIPTION OF THE DRAWINGS

FIG. 2 (b) illustrates a partial structure of the electrode plate array shown in FIG. 2 (a);

FIG. 2 (c) illustrates a schematic view of an equivalent circuit of the partial structure of the electrode plate array shown in FIG. 2 (b);

DETAILED DESCRIPTION

Reference will now be made in detail to the exemplary embodiments of the disclosure, which are illustrated in the accompanying drawings. Wherever possible, the same reference numbers will be used throughout the drawings to refer to the same or similar parts.

The present disclosure provides a physical unclonable function (PUF) chip and fabrication method. For example, when forming a top metal connection layer of a nude chip, an array of spaced electrode plates is simultaneously formed. A deposition layer is then formed on the top metal connection layer and between adjacent electrode plates in any row. Adjacent electrode plates along with the deposition layer form a capacitor. The fabrication method in the disclosure further includes forming openings in the deposition layer between the electrode plates with a circumference of the openings tangent to the two electrode plates and coating a conductive coating layer made of conductive particles with randomly distributed size on the nude chip to make the capacitors randomly connected. The nude chip is then packaged to provide a physical unclonable function (PUF) chip.

The fabrication method in the present disclosure prevents chips on the same wafer having the same capacitor connection information, such that chips on the same wafer have different capacitor connection states and the security of the chips is enhanced.

Figure 1:
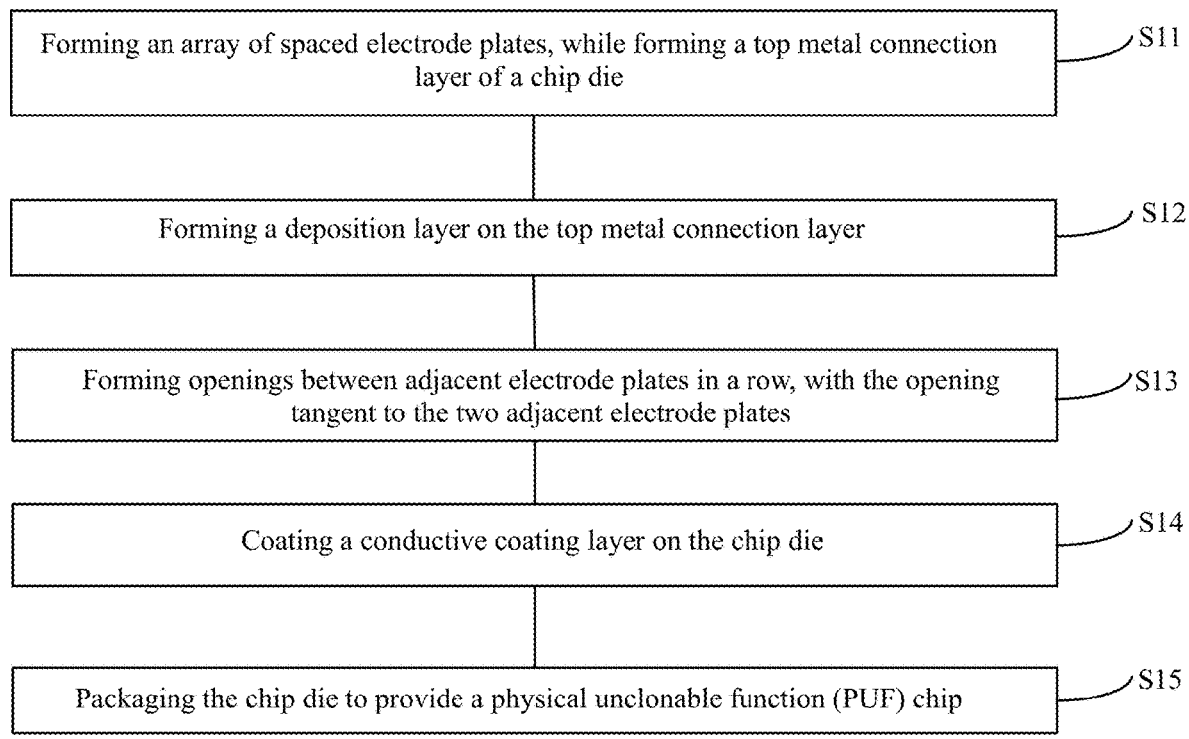
FIG. 1 illustrates an exemplary method for fabricating a physical unclonable function (PUF) chip consistent with various disclosed embodiments.

FIG. 1 illustrates an exemplary fabrication process of a physical unclonable function (PUF) chip consistent with various disclosed embodiments.

In S11, while a top metal connection layer of a nude chip is formed, an array of spaced electrode plates is formed simultaneously.

In one embodiment, a comb-like mask pattern may be provided on the top metal connection layer of the nude chip. After an exposure process, an array of spaced electrode plates may be formed on the top metal connection layer of the nude chip. In other words, a top metal connection layer including an array of spaced electrode plates is formed. The array of spaced electrode plates may also be referred to as comb-like electrode plates. The process of forming the comb-like electrode plates does not require any additional steps, and the top metal connection layer including an array of spaced electrode plates is formed simultaneously when the top metal connection layer is formed.

In one embodiment, the electrode plates in the array of spaced electrode plates may be electrode plates of the same size.

In one embodiment, the adjacent electrode plates in any row of the array of spaced electrode plates may be evenly spaced apart by equal intervals.

In S12, after an array of spaced electrode plates is formed, a deposition layer is formed on the top metal connection layer.

In one embodiment, the deposition layer may be formed on the top metal connection layer by an in-mold decoration (IMD) process. Other methods may also be used to form the deposition layer on the top metal connection layer without limitation.

Because the top metal connection layer of the nude chip includes the array of the spaced electrode plates and a deposition layer is formed on top of the top metal connection layer. Two adjacent electrode plates in any row and the deposition layer between these two electrode plates may form a capacitor, where the deposition layer between the electrode plates provides a dielectric material of the capacitor. The deposition layer may be used as a protective layer of the top metal connection layer to prevent oxidation of the top metal connection layer.

Figure 2A:
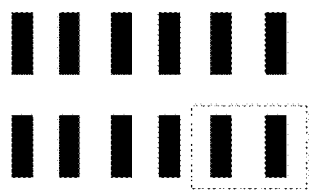
FIG. 2 (a) illustrates an exemplary array of electrode plates consistent with various disclosed embodiments.
Figure 2B:
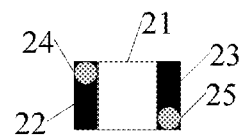
Figure 2C:

FIG. 2 (a) shows a schematic view of an array of electrode plates; FIG. 2 (b) shows a schematic view of a partial structure of the electrode plate array shown in FIG. 2 (a); and FIG. 2 (c) shows a schematic view of the equivalent circuit of the partial structure of the electrode plate array shown in FIG. 2 (b).

In an example shown in FIG. 2(a), an array of electrode plates with two rows and six columns is formed on the top metal connection layer for illustrative purposes, and a deposition layer is formed over the entire top metal connection layer. For illustrative purposes, the electrode plate structure shown in FIG. 2(b) takes the example of the electrode plates located at the fifth column and the sixth column of the second row, that is, the electrode plates in the dashed box of FIG. 2(a).

As shown in FIGS. 2(a)-2(b), a deposition layer 21, e.g., an oxide deposition layer, may be used as a dielectric material between electrode plates, including a first electrode, such as a top metal connection layer 22 (e.g., an aluminum layer) and a second electrode, such as an adjacent top metal connection layer 23 (e.g., an aluminum layer). The top metal connection layers 22 and 23 may be used as upper and lower electrode plates. Conductive vias, such as top metallic vias 24 and 25, respectively on the top metal connection layers 22 and 23, can internally connect the upper and lower electrode plates, so that the electrode plates and the deposition layer between adjacent electrode plates can be equivalent to a capacitor C1, as shown in FIG. 2 (c).

Returning to the fabrication process shown in FIG. 1, in S13, openings are formed between adjacent electrode plates in a row. Each electrode plate is tangent to a circumference of a corresponding opening.

In one embodiment, to facilitate wiring, an opening may be formed between adjacent electrode plates in a row. The circumference of the opening may touch electrode plates on opposite sides. A length direction of the opening may be in parallel with a surface of each electrode plate. The openings may have any suitable cross-sectional shapes, for example, having a circular or elliptical shape.

Figure 3:
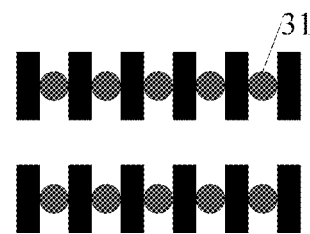
FIG. 3 illustrates a schematic view of a nude chip with openings consistent with various disclosed embodiments.

For example, FIG. 3 illustrates a schematic view of a nude chip structure after forming openings consistent with various disclosed embodiments. As shown in FIG. 3, during a passivation process, opening 31 may be formed between and on the comb-like metal line, i.e., between adjacent electrode plates. In some cases, such opening may be referred to as a "PA" opening.

Returning to the fabrication process shown in FIG. 1, in S14, a conductive coating layer is coated onto the nude chip.

In one embodiment, the conductive coating layer can be directly coated to the region containing openings.

In one embodiment, the conductive coating layer including conductive particles may be coated in the region of the openings before packaging. In the conductive coating layer, the size of the conductive particles is randomly distributed. In some cases, the conductive particles in the opening can be randomly connected to form connecting wires and thus to bridge adjacent (e.g., upper and lower) electrode plates of the capacitor. Due to a random size distribution of the conductive particles, the connecting wires may form randomly distributed bridges, allowing the capacitors to be randomly bridged. A random combination of different capacitors may be formed with strict uncertainties.

When the conductive particles have a diameter smaller than the diameter of the PA openings, the conductive particles can enter the PA openings. If 2 to 3 conductive particles are in the PA openings, the capacitors are probable to bridge. If the diameter of the conductive particles is smaller than the diameter of the PA openings and only 1 to 2 conductive particles are in the PA openings, it's possible the capacitors may still bridge. When the diameter of the conductive particles is larger than the diameter of the PA openings, the conductive particles cannot enter the PA openings and the capacitors are in a normal state.

Figure 4:
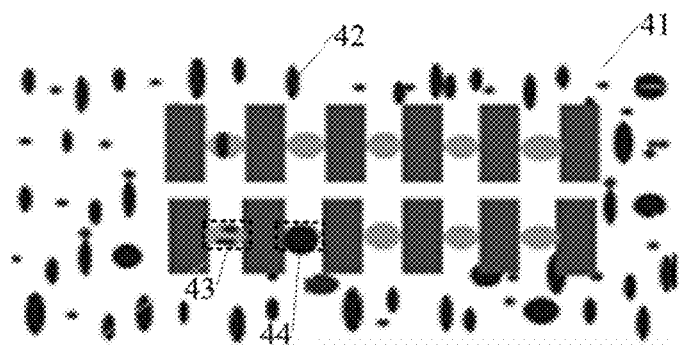
FIG. 4 illustrates a schematic structural view of a nude chip after coated with a conductive coating layer consistent with various disclosed embodiments.

FIG. 4 illustrates a schematic view of an exemplary nude chip structure coated with a conductive coating layer consistent with various disclosed embodiments. As shown in FIG. 4, the conductive coating layer 41 coated on the nude chip surface includes a number of conductive particles 42 with randomly distributed sizes. When the diameter of the conductive particle 42 is smaller than the diameter of the opening, the conductive particle 42 can enter the openings, possibly forming conductive connections and bridging the capacitors, as shown by the region 43. When the diameter of the conductive particle 42 is larger than the diameter of the opening, the conductive particle 42 cannot enter the openings and the connecting wires may not be formed. As a result, the upper and lower electrode plates of the capacitor are not bridged, and the capacitor is in a normal state, as illustrated by the area 44.

Figure 5:
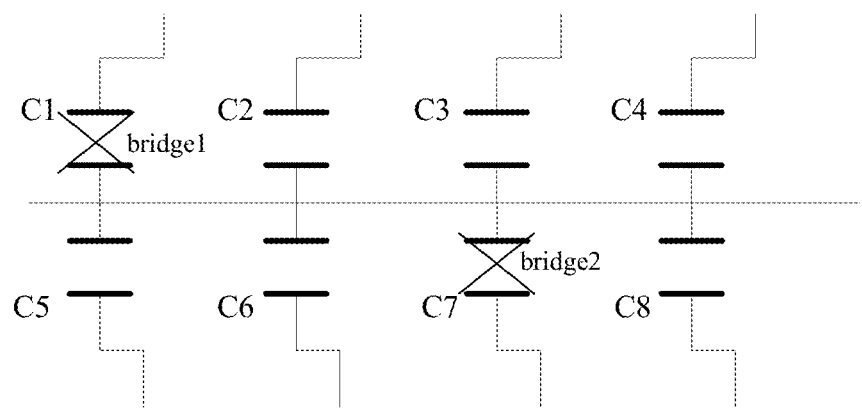
FIG. 5 illustrates a schematic view of a capacitor connection state consistent with various disclosed embodiments.

FIG. 5 shows a schematic representation of an exemplary connection state of capacitors. In the example shown in FIG. 5, the nude chip includes eight capacitors C1, C2, C3, C4, C5, C6, C7 and C8. As the size of conductive particles is randomly distributed, two bridges including bridge 1 and bridge 2 are formed. As a result, C1 and C7 are bridged, and C2, C3, C4, C5, C6 and C8 are in a normal capacitor state. The connection state of the capacitors is random and physically unclonable, which can constitute a random password.

In one embodiment, a 64-bit password is taken as an example. For example, each PA opening represents one bit of the password and the probability of the PA opening in an open circuit or a short circuit is 50%. The total number of permutations for 64 openings being in an open circuit or a short circuit is $2^{64}$, which means that the password could have $2^{64}$ possibilities. In such a way, the security of the physical unclonable function (PUF) chip is increased. The number of bits of the password herein is only for illustrative purpose without limitation. In one embodiment, the password may have any number of bits other than 64, and PA openings and electrode plate arrays may be formed correspondingly.

In S15, the nude chip is packaged to obtain the physical unclonable function (PUF) chip.

In one embodiment, after packaging the nude chip, the connection state of the capacitors formed between the adjacent electrode plates in an arbitrary row is detected and the detection result is stored to the storage unit of the physical unclonable function (PUF) chip.

To improve the anti jamming performance of the chip, the storage unit may be a nonvolatile memory according to one embodiment of the present disclosure.

Figure 6:
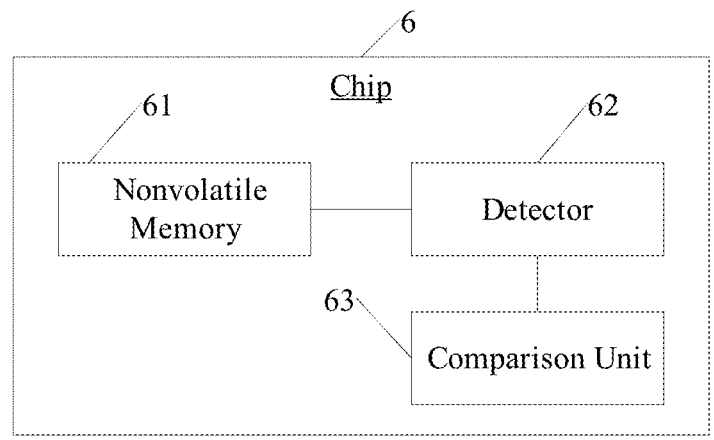
FIG. 6 illustrates a schematic structural view of a core circuit of a chip consistent with various disclosed embodiments.

FIG. 6 illustrates a schematic structural view of the core circuit of a chip consistent with the disclosed embodiment. The core circuit of the chip 6 includes a nonvolatile memory 61, a detector 62, and a comparison unit 63. In one embodiment, the random distribution of the bridge connections causes the capacitor to be connected at random. The capacitor connection state caused by the conductive particles in the chip package can be detected by the detector 62 in the core circuit of the chip 6, and the connection state is output and stored in the nonvolatile memory 61.

During operation, the detector 62 may detect the capacitor connection state of the chip caused by conductive particles. The connection state of two capacitors can be compared by the comparison unit 63 and the comparison result is output and stored in the nonvolatile memory 61. In such a way, whether the physical unclonable function of the chip is damaged can be detected during the operation of the chip, such that the chip's anti-attack capability is improved. Because the capacitors are randomly distributed, when the capacitor connection state of a capacitor circuit is destroyed, the capacitor connection state is unable to be duplicated, and therefore the security of a chip is increased.

As such, an array of spaced electrode plates is simultaneously formed while forming top metal connection layer of a nude chip, and a deposition layer is formed on the top metal connection layer, such that the deposition layer between two adjacent electrode plates in any row, along with the two electrode plates form a capacitor. Openings are formed in the deposition layer between the electrode plates, having circumference tangent to the electrode plates. A conductive coating layer including conductive particles with randomly distributed size is formed on the nude chip to make the capacitors randomly connected. The nude chip may be packaged to provide a physical unclonable function (PUF) chip. The fabrication method in the present disclosure prevents chips on the same wafer having the same capacitor connection state. Chips on the same wafer may have a different capacitor connection state, and the security of a chip is enhanced.

Figure 7:
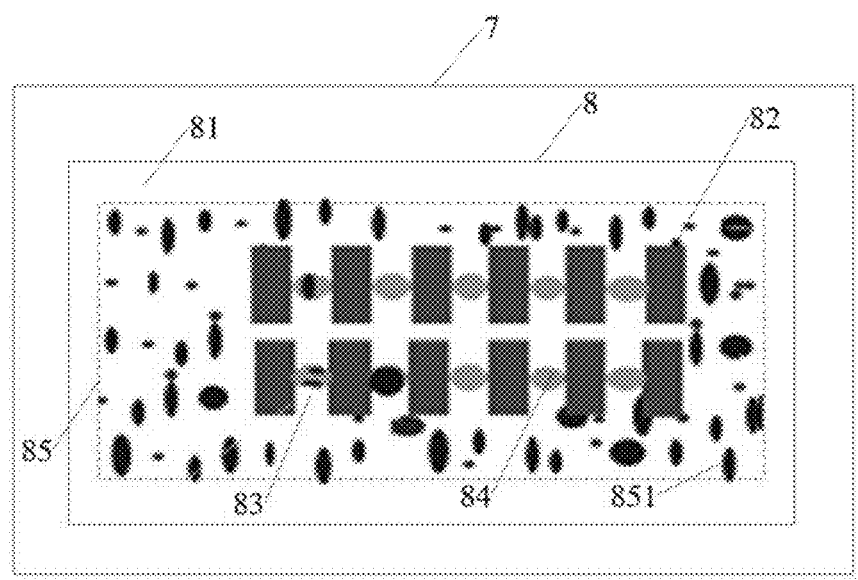
FIG. 7 illustrates a schematic structural view of an exemplary physical unclonable function (PUF) chip consistent with various disclosed embodiments.

FIG. 7 provides a schematic structural view of a physically unclonable function (PUF) chip consistent with various disclosed embodiments. The exemplary PUF chip may include a package substrate 7 and a nude chip 8. The nude chip 8 is formed on the package substrate 7, and the nude chip includes a top metal connection layer 81, an array of spaced electrode plates 82, a deposition layer 83, openings 84 and a conductive coating layer 85.

The array of spaced electrode plates 82 is formed on the top metal connection layer 81 of the nude chip 8 and is formed simultaneously with the top metal connection layer.

The deposition layer 83 is formed on the top metal connection layer 81.

The openings 84 are tangent to each of the two adjacent electrode plates in a row and are formed between the two adjacent electrode plates.

The conductive coating layer 85 is coated on the nude chip 8. The conductive coating layer 85 includes conductive particles 851 and the size of the conductive particles 851 is randomly distributed.

In one embodiment, the top metal connection layer 81 of the nude chip 8 is exposed by providing a comb-shaped mask pattern on the top metal connection layer 81 of the nude chip 8, and the array of the spaced electrode plates 82 is formed on the top metal connection layer 81 of the nude chip 8.

In one embodiment, the conductive coating layer 85 is coated at least in the region of the openings 84.

In one embodiment, the deposition layer 83 is formed between two adjacent electrode plates in any row by an IMD process.

In one embodiment, the chip may further include a detector (not indicated) and a storage unit (not indicated). The detector is appropriate for detecting the connection state of the capacitors, formed between adjacent electrode plates in any row and having the deposition layer 83 between the two electrode plates. The storage unit is used to store the detection result detected by the detector.

In one embodiment, the storage unit is a nonvolatile memory. Any other appropriate storage unit may also be used for storing the detection result by those skilled in the art according to their actual needs.

In one embodiment, the electrode plates in the array of spaced electrode plates 82 have the same size.

In one embodiment, the adjacent electrode plates in any row of the array of spaced electrode plates 82 are evenly spaced at equal intervals.

All or a portion of the various processes of the disclosed embodiments may be accomplished by a program to control the associated hardware. The controlling program may be stored in a computer readable storage medium, such as ROM, RAM, disk, or disc.

Compared with the conventional method, the fabrication method in the disclosure is advantageous. In the present disclosure, an array of spaced electrode plates is simultaneously formed when the top metal connection layer of the nude chip is formed, and a deposition layer is formed on the top metal connection layer, such that two adjacent electrode plates in any row and the deposition layer between the two adjacent electrode plates form a capacitor. Various openings that are tangent to the two electrode plates are then formed on the deposition layer between the electrode plates. A conductive coating layer including conductive particles with randomly distributed size is then coated on the nude chip to make the capacitors randomly connected. The nude chip is packaged to provide a physical unclonable function (PUF) chip. The fabrication method in the disclosure prevents chips on the same wafer having the same capacitor connection state, such that chips on the same wafer may have different capacitor connection states and the security of a chip is enhanced.

Further, by detecting and storing the connection state of the capacitors in the nude chip, it is possible to verify the physical unclonable function of a chip by detecting the connection state of the capacitors before using the chip, thereby improving the anti-attack capability of the chips.

Further, the connection state of capacitors is stored in a nonvolatile memory, and the stored connection state of the capacitors can be maintained while the chip is powered down, such that the anti jamming performance of the chip can be improved.

The above detailed descriptions only illustrate certain embodiments of the disclosed disclosure, and are not intended to limit the scope of the disclosed disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A method of fabricating a physical unclonable function (PUF) chip, comprising:
   forming a top metal connection layer of a chip;
   forming an array of spaced electrode plates on the top metal connection layer of the chip;
   forming a deposition layer, on the top metal connection layer between each two adjacent electrode plates;
   forming an opening in the deposition layer between each two adjacent electrode plates in a row, wherein each two adjacent electrode plates are tangential to the opening formed between the two adjacent electrode plates;
   coating a conductive coating layer on the chip, the conductive coating layer including conductive particles with randomly distributed size to form randomly distributed bridges between adjacent two electrode plates; and
   packaging the chip to provide the PUF chip.

2. The method according to claim 1, wherein forming the array of spaced electrode plates on the top metal connection layer comprises:
   providing a comb-shaped mask pattern when forming the top metal connection layer of the chip; and
   exposing the nude chip to form the array of spaced electrode plates.

3. The method according to claim 1, wherein:
   the conductive coating layer is coated in a region of the openings.

4. The method according to claim 1, wherein:
   the deposition layer is formed between adjacent electrode plates in any row by an in-mold decoration (IMD) process.

5. The method according to claim 1, further comprising:
   detecting a connection state of a capacitor, formed by the adjacent electrode plates in a row having the deposition layer there-between; and
   storing a detection result in a storage unit of the PUF chip.

6. The method according to claim 5, wherein:
   the storage unit is a nonvolatile memory.

7. The method according to claim 1, wherein:
   the electrode plates in the array of spaced electrode plates have a same size.

8. The method according to claim 1, wherein:
   the adjacent electrode plates in any row of the array of spaced electrode plates are arranged at equal intervals.

9. The method according to claim 1, wherein:
   a capacitor formed by the bridged adjacent two electrode plates is in a bridged capacitor state, and
   a capacitor formed by non-bridged adjacent two electrode plates is in a normal capacitor state.

10. The method according to claim 1, wherein:
    the conductive coating layer is directly formed in each of the openings in the deposition layer.

11. The method according to claim 1, wherein:
    the bridged adjacent two electrode plates are electrically connected by conductive particles distributed between the bridged adjacent two electrode plates.

* * * * *